(12) United States Patent
Freitag et al.

(10) Patent No.: US 6,293,021 B1
(45) Date of Patent: Sep. 25, 2001

(54) PROCESS FOR ARRANGING AN ANGLE SCALE ON AN INDEX DISK FOR ROTATIONAL MEASUREMENT SYSTEMS AND AN INDEX DISK WITH ANGLE SCALE FOR ROTATIONAL MEASUREMENT SYSTEMS

(75) Inventors: Hans-Joachim Freitag, Jena; Heinz-Guenther Franz, Diekkamp 26, D-22359 Hamburg, both of (DE)

(73) Assignees: Johannes Heidenhain GmbH, Traunreut; Heinz-Guenther Franz, Hamburg, both of (DE)

( * ) Notice: Subject to any disclaimer, the term of this patent is extended or adjusted under 35 U.S.C. 154(b) by 0 days.

(21) Appl. No.: 09/183,083

(22) Filed: Oct. 30, 1998

(30) Foreign Application Priority Data

Oct. 31, 1997 (DE) .............................. 197 48 292

(51) Int. Cl.⁷ .................................................. G01D 5/34
(52) U.S. Cl. .............................. 33/1 PT; 33/645; 33/644
(58) Field of Search ......................... 33/1 PT, 520, 33/613, 644, 645, 706, 707, 708

(56) References Cited

U.S. PATENT DOCUMENTS

| 1,329,234 | * | 1/1920 | Evans ..................................... 33/520 |
| 2,966,309 | * | 12/1960 | Cole et al. ............................. 33/645 |
| 4,202,551 | * | 5/1980 | Darnell, Jr. . |
| 4,474,047 | * | 10/1984 | Carlson ................................. 33/1 PT |
| 4,892,422 | * | 1/1990 | Stahlecker . |
| 4,933,927 | * | 6/1990 | Ross ...................................... 33/644 |
| 5,035,062 | * | 7/1991 | Leonov et al. ......................... 33/645 |
| 5,126,560 | | 6/1992 | Kraus . |
| 5,183,350 | * | 2/1993 | Kramer . |
| 5,365,672 | * | 11/1994 | Kato ...................................... 33/644 |
| 5,593,164 | * | 1/1997 | Mraz et al. ............................ 33/644 |
| 5,798,887 | * | 8/1998 | Yoshida et al. . |
| 5,843,264 | * | 12/1998 | Mabuchi et al. . |
| 5,923,032 | * | 7/1999 | Carlson et al. . |
| 5,970,621 | * | 10/1999 | Bazydola et al. ...................... 33/613 |
| 6,082,009 | * | 1/2000 | Tillis, Sr. et al. ..................... 33/1 PT |

FOREIGN PATENT DOCUMENTS

| 352835 | | 4/1961 | (CH) . |
| 34 19 101 | | 7/1985 | (DE) . |
| 86 14 601 | | 9/1986 | (DE) . |
| 195 46 595 | | 6/1997 | (DE) . |
| 296 22 996 | | 11/1997 | (DE) . |
| 0 066 636 | | 12/1982 | (EP) . |
| 466228 A | * | 1/1992 | (EP) ................................... 33/1 PT |
| 0779515 A2 | | 6/1997 | (EP) . |
| 2176013 A | * | 12/1986 | (GB) ................................... 33/1 PT |
| 62-7022 | | 1/1967 | (JP) . |
| 62-7025 | | 1/1987 | (JP) . |

OTHER PUBLICATIONS

English Abstract of JP 56049916, May 6, 1981.
English Abstract of JP 06003160, Jan. 11, 1994.
English Abstract of JP 05296789, Nov. 09, 1993.
English Abstract of JP 62057140, Mar. 12, 1987.
English Abstract of EP 0779515 A2, Jun. 18, 1997.

* cited by examiner

*Primary Examiner*—G. Bradley Bennett
(74) *Attorney, Agent, or Firm*—Reed Smith LLP

(57) ABSTRACT

In a process for arranging an angle scale at an index disk for rotational measurement systems, wherein the index disk is provided with a central opening for mounting on a carrier shaft, a clamping device which deforms elastically in the radial direction when the index disk is mounted on the carrier shaft is arranged in the opening, the index disk is subsequently mounted on a reference shaft and the angle scale is then arranged on the index disk so as to be exactly centered with respect to the center axis (A—A) of the reference shaft. The index disk formed in this way accordingly has a clamping device along the circumference of the central opening, which clamping device is deformed elastically in the radial direction when the index disk is mounted on the carrier shaft, contacts the outer surface of the carrier shaft accompanied by tension and, in doing so, centers the index disk in its mounted state relative to the carrier shaft.

4 Claims, 4 Drawing Sheets

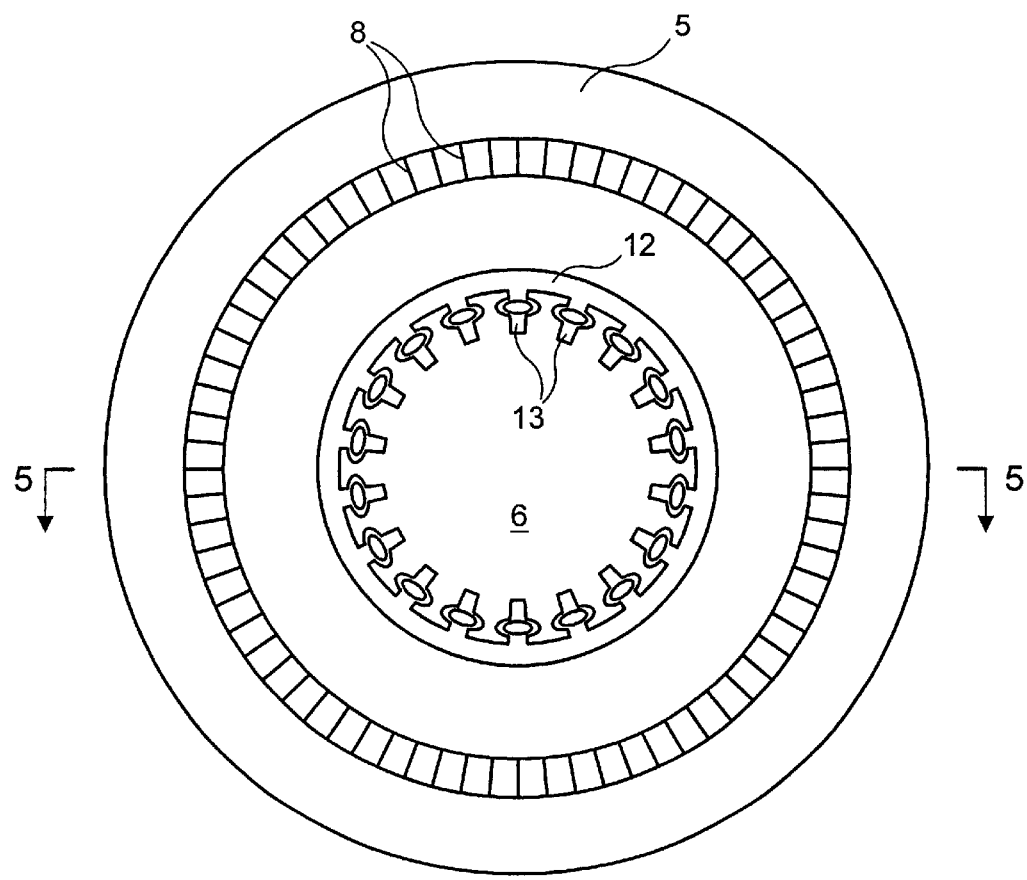
F I G. 4
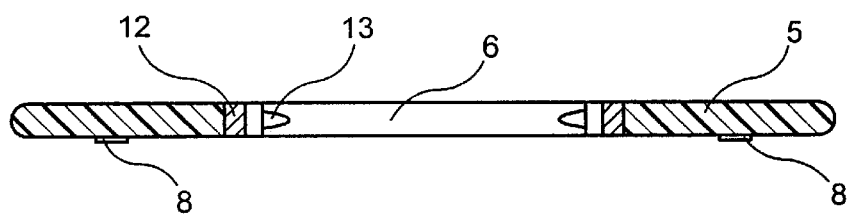
F I G. 5

PROCESS FOR ARRANGING AN ANGLE SCALE ON AN INDEX DISK FOR ROTATIONAL MEASUREMENT SYSTEMS AND AN INDEX DISK WITH ANGLE SCALE FOR ROTATIONAL MEASUREMENT SYSTEMS

BACKGROUND OF THE INVENTION a) Field of the Invention

The invention is directed to a process for arranging an angle graduation or angle scale at an index disk for rotational measurement systems, wherein the index disk is provided with a central opening for mounting on a carrier shaft, and further to an index disk which is produced in particular according to a process of the type mentioned above for rotational measurement systems with an angle scale arranged thereon and with a central opening for mounting on a carrier shaft.

b) Description of the Related Art

Index disks are used as scale carriers or code carriers in rotational measurement systems for measuring the rotational position of two objects moving relative to one another, e.g., for measuring angles, rotational paths or the like. For this purpose, the angle scale which is arranged on the index disk and which rotates relative to a sensing unit is sensed by the latter and the obtained sensed information is then converted by means of an evaluating unit into corresponding information, e.g., pertaining to the angle of rotation or the like. The sensing is carried out by means of suitable sensing methods, wherein photoelectric, magnetic, inductive or capacitive sensing are used in particular. Common to all of these methods, however, is the fundamental principle that the angle scale, which is generally periodic (incremental), must be centered relative to the axis of rotation of the index disk, so that the sensing information represents a measurement of the relative rotational position of the two objects moving relative to one another. In absolute angle measurement systems or in rotation sensors, information about the absolute rotational angle is generally obtained from the rotational angle information of a plurality of angle scales which are arranged concentrically on the index disk.

The achievable rotational angle measuring accuracy is decisively determined by, among others, the accuracy of the angle scale and by the deviations occurring as a result of the eccentricity of the scale relative to the support, i.e., relative to the axis of rotation of the receiving carrier shaft.

The angle scales to be arranged on the index disks can be produced economically with very high accuracy, especially for sensing based on photoelectric principles. For example, standard incremental disks with an angle indexing accuracy of less than 2 angle seconds are already available.

However, a much greater and more complex problem is that of the eccentricity of the scale relative to the support or axis of rotation of the carrier shaft. Depending on the angle measurement accuracy and angular resolution to be achieved, the use of index disks of different constructions formed of various materials is taken into consideration primarily from a cost stand point.

In this connection, very thin electroformed and photoetched index disks are known which, while having relatively good centricity of the angle scale relative to the receiving bore, have strict limitations with respect to the angular resolution that can be achieved and are very sensitive as regards handling.

High angular resolutions and high angular resolution accuracies can be realized advantageously with glass index disks. However, these glass index disks have the disadvantage that the receiving bore can be produced at reasonable cost only with very rough tolerances, so that they cannot be used in the assembly process for centering on the carrier shaft. Therefore, specifically for purposes of centering, index disks of this kind are provided with a centering circle for adjusting the position of the index disk on the carrier shaft. This commonly used adjustment process requires special auxiliary sighting means for viewing the adjustment circle, e.g., adjusting microscopes or video cameras, and is also very time-consuming.

OBJECT AND SUMMARY OF THE INVENTION

On this basis, the primary object of the invention is to develop further a process for arranging an angle scale on an index disk for rotational measurement systems of the type mentioned above in such a way that the index disk can be manufactured economically and can be mounted simply and quickly on a carrier shaft with minor eccentricity errors of the angle scale relative to the axis of rotation of the carrier shaft in spite of coarse diameter tolerances of the carrier shaft.

According to the invention, this object is met in a process of the type mentioned above in that a clamping device is arranged in the opening of the index disk, which clamping device deforms elastically in the radial direction when the index disk is arranged on a shaft, whereupon the index disk is mounted on a reference shaft and, subsequently, the angle scale is arranged on the index disk so as to be exactly centered with respect to the center axis of the reference shaft. In this respect, a reference shaft is preferably used whose diameter corresponds to the nominal receiving diameter of the carrier shaft for which the index disk is intended.

In a surprisingly simple manner, the process according to the invention ensures that, because of the constantly uniformly acting self-centering effect which is produced by the elastic pretensioning action of the clamping device when the index disk is mounted on a shaft, the angle scale, when mounted on the index disk, is exactly centered with respect to the same axis of rotation as that with respect to which it is centered when the index disk provided with this angle scale is mounted on a carrier shaft. Due to the radially elastically deformable clamping device which is deformed when mounted on a shaft, the virtual axis of rotation which is given by the clamping device and which extends vertical to the plane of the index disk remains fixed and unaltered even when the diameter of the carrier shaft changes, wherein this holds true for a large range of tolerances of the diameter of the carrier shaft. Due to the fact that the index disk, with its clamping device which is elastically deformable in the radial direction, is initially mounted on a reference shaft and, in this state, the angle scale is then arranged on the index disk so as to be exactly centered with respect to the center axis of the reference shaft, the angle scale can be centered on the index disk in a very precise manner with respect to the center axis of this reference shaft. If the index disk provided in this way with the angle scale is mounted on a (different) carrier shaft at a later time, the self-centering effect of the clamping device again brings about an exact alignment of the angle scale arranged on the index disk with respect to the center axis of this (new) carrier shaft, so that the accuracy of the centering with which the angle scale was arranged on the index disk relative to the center point of the reference shaft is also fully maintained in this case relative to the center of rotation of the carrier shaft. The radially elastically deformable clamping device makes this possible by means of its self-centering effect which always causes the angle scale to be precisely centered with respect to the axis of rotation of the respective shaft on which the index disk is mounted, independent from the diameter tolerances of the respective shaft, during the mounting of the angle scale as well as in the mounted state.

The angle scale can be arranged on the index disk in a simple manner by a device in which the angle scale is arranged so as to be centered in a highly accurate manner with respect to the reference shaft used therein. The diameter of this reference shaft preferably corresponds to the nominal receiving diameter of the carrier shaft for which the index disk is intended in the specific case. In case of subsequent mounting, e.g., in an angle measurement device, if the index disk which has been provided with this angle scale is mounted on the receiving shaft provided in this angle measurement device, the clamping device centers the index disk again in a completely identical manner with respect to the axis of rotation of this shaft, so that the angle scale is also exactly centered relative to the axis of this carrier shaft.

The invention is also directed to an index disk for rotational measurement systems with an angle scale arranged thereon and with an opening for mounting on a carrier shaft.

According to the invention, in an index disk of the kind mentioned above, a clamping device is provided along the circumference of the central opening, which clamping device is deformed elastically in the radial direction when the index disk is mounted on the carrier shaft, contacts the outer surface of the carrier shaft accompanied by tension and, in this way, centers the index disk in its mounted state relative to the carrier shaft. All of the advantages which have already been shown in the above-described process according to the invention for the centric mounting of the angle scale on the index disk also apply in an analogous manner to the index disk itself, according to the invention. Due to the fact that the angle scale in the index disk according to the invention is exactly centric to the reference shaft when the index disk, including its clamping device, is mounted on this reference shaft, then, as was already stated above with respect to the process, when an index disk which is constructed in the manner described above and provided with the angle scale is subsequently used on a carrier shaft, the exactness of the centering of the angle scale is maintained also with respect to the axis of rotation of this carrier shaft, so that only very minor eccentricity errors occur even in case of coarse diameter tolerances of the carrier shaft.

In the index disk according to the invention, the central opening is preferably provided in a hub formed at the index disk, so that an especially good fit of the clamping device on a carrier shaft is achieved compared with a completely flat index disk. In this connection, the hub is preferably formed integral with the index disk, wherein this part is preferably constructed as an injection molded part from transparent plastic. The invention makes it possible for high temperature resistant and highly transparent plastics which have only recently been made available to be used for index disks of the type mentioned above while retaining the same precision and accuracy of adjustment of the angle scale, wherein very fine angle scales can also be used, which was not previously possible when using plastics for index disks of this kind.

In a particularly preferable construction of the index disk according to the invention, the clamping device is formed of an elastic ring which is arranged along the circumference of the opening and which is preferably constructed as an O-ring and is also preferably fastened to the hub.

Another advantageous construction of the invention consists in that the clamping device is formed of a plurality of clamping elements which are uniformly arranged along the circumference of the opening, are elastically deformable in the radial direction and have identical spring characteristics. Due to the fact that this plurality of elastic clamping elements does not form a closed cylindrical surface in the region of their positive and frictional engagement with the shaft, no circumferential stresses which, in extreme cases, could lead to the destruction of the shaft-hub connection can occur at these clamping elements. Due to the uniform arrangement of these clamping elements along the circumference of the opening and due to their identical spring characteristics, a particularly high positional stability of the index disk is achieved relative to the shaft on which it is mounted with respect to both radial deviation and axial run-out or planar deviation because, due to the uniform arrangement of identically acting clamping elements, the sum of the radial force components in these elastic clamping elements cancel each other out.

Another particularly preferred construction of the invention, especially with respect to index disks with strict requirements regarding axial run-out, consists in that the hub is glued to the index disk. This is preferably carried out by a special device which has a receiving cylinder having the nominal receiving diameter of the hub which is aligned in a highly precise manner with respect to a contact surface for the index disk. The index disk which contacts this contact surface by the scale plane is glued by means of a compensating cement to the hub which is received on the receiving shaft and centered thereon. The required high manufacturing tolerances with respect to axial run-out are required only for the device; the actual series parts can be manufactured economically with improved tolerances.

The clamping device and the elastic clamping elements used therein are preferably made of rubber-elastic material. In another particularly advantageous embodiment form, the clamping elements are constructed as springing tongues which project into the opening in the hub or as molded knobs or projections of elastically deformable material, wherein these molded projections project into this opening proceeding from a ring arranged around the circumference of this opening.

The clamping device can be arranged within the opening in any suitable and fitting manner. However, the clamping device is preferably arranged at or in the vicinity of the outer edge of the opening formed on one side of the index disk. But it can also be advantageous in many applications, especially when a particularly intensive clamping effect is desired, to provide a clamping device on both sides of the index disk, especially at each outer edge of the opening formed at the index disk.

It can also be advantageous when the index disk is made from a material other than that from which the self-centering hub is made.

Another, likewise very advantageous construction of the index disk, according to the invention, with a hub which has an opening with clamping elements which are arranged therein in a uniform manner and are elastically deformable in the radial direction and which provide a support relative to a central rotating shaft consists in that an index disk constructed in the manner mentioned above with a hub and clamping elements is not constructed so as to be mountable on a shaft but, rather, is already connected directly with a shaft. In this respect, the index disk with hub, e.g., made of plastic by injection molding, can be injection molded directly around a steel shaft. In this case, it is ensured by way of the tool that the index disk is always injection molded vertically to the shaft. The special construction of the hub with these elastic elements also ensures a high degree of positional stability over a large temperature range, wherein the elastic clamping elements of the hub can be connected not only in a frictional engagement but also (additionally, as the case may be) in a positive engagement with the shaft in order to ensure full functionality even in the event of large changes in temperature.

In the following, the invention in principle will be described more fully by way of example with reference to the drawing.

BRIEF DESCRIPTION OF THE DRAWINGS

In the drawings:

FIG. 4 shows a top view of an embodiment form of an index disk, according to the invention, provided with an angle scale;

FIG. 5 shows a section along line V—V in FIG. 4;

DESCRIPTION OF THE PREFERRED EMBODIMENTS

Figure 1:
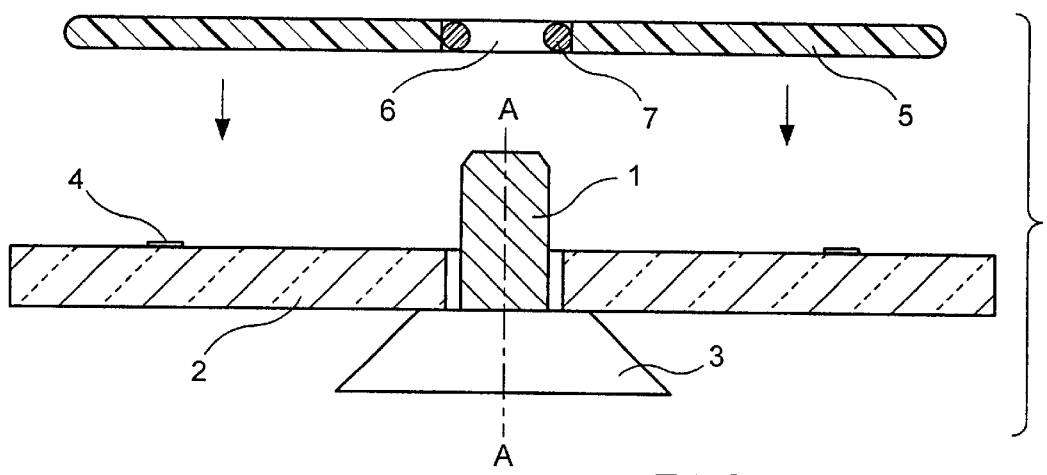
FIGS. 1 and 2 show schematic views of the individual steps for carrying out the process according to the invention.
Figure 2:
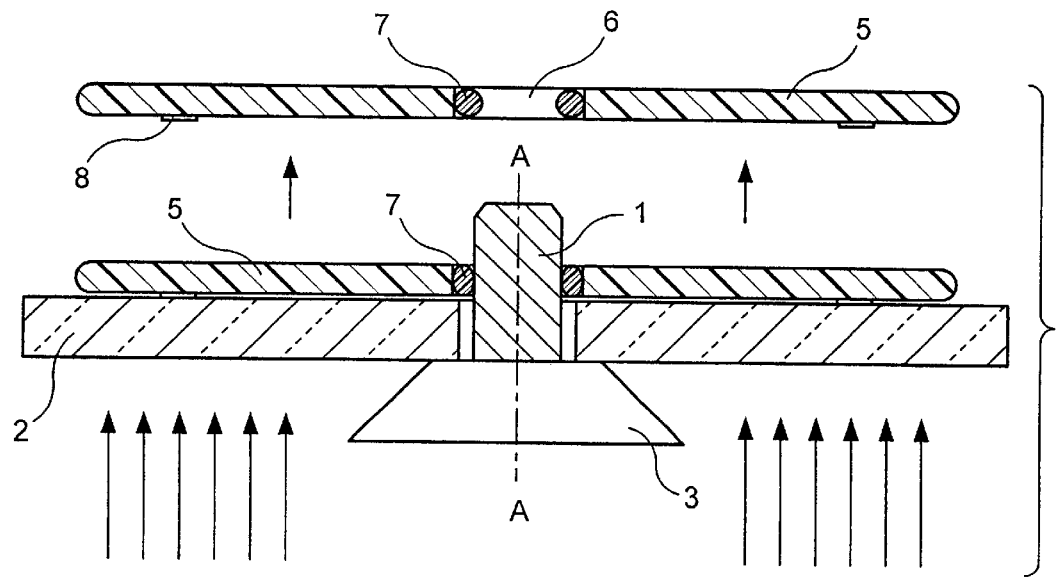

FIGS. 1 and 2 show schematically the steps to be carried out in executing the process according to the invention.

FIG. 1 shows a (schematic) view of a device which can be used for arranging an angle scale on an index disk in a centered manner as is required for carrying out the process. This device has, in its center, a reference shaft 1 and a contact plate 2 of transparent material, e.g., glass, which is arranged concentric to the reference shaft and whose surface is aligned exactly at a right angle to the center axis A—A of the reference shaft 1. The contact plate 2 and the reference shaft 1 are jointly fastened to a suitable support 3.

A ruled pattern 4 for an angle scale is arranged on the surface of the transparent contact plate 2 so as to be exactly centric to the center axis A—A of the reference shaft 1.

FIG. 1 shows, above the device (in section), an index disk 5 which is provided with a centric opening 6 in which is arranged a circumferentially extending, elastically deformable ring 7 in the form of an O-ring. The elastic ring 7 is connected in a suitable manner on its radial outer side with the contacting circumferential wall of the opening 6, e.g., by a suitable glue or the like.

This index disk 5 is mounted on the reference shaft 1 until contacting the surface of the contact plate 2, resulting in the state shown in FIG. 2. When the index disk 5 is mounted on the reference shaft 1, the elastic ring 7 is radially deformed as can be seen in the view in FIG. 2. The radial deformation of the elastic ring 7 causes a self-centering effect acting on the index disk 5 around the center axis A—A of the reference shaft 1.

Subsequently, exposure is carried out from the underside of the transparent contact plate 2 as is indicated by the arrows in FIG. 2. The pattern 4 of the angle scale arranged on the index disk 2 exactly centric to the center axis A—A of the reference shaft 1 is transferred in a known manner by photochemical or photomechanical means by this exposure to the underside of the index disk 5 which is sensitive to the exposure, ultimately resulting in a finished index disk 5 provided with an angle scale 8 arranged thereon as is shown above the device in FIG. 3.

Figure 3:
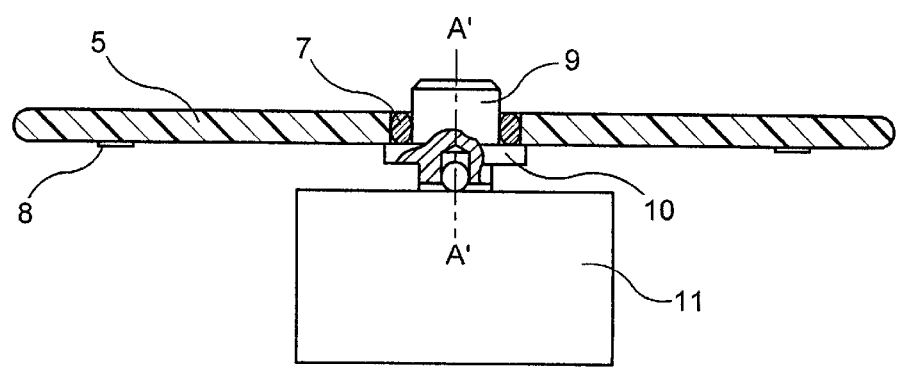
FIG. 3 shows a schematic sectional view through an index disk, according to the invention, mounted on a carrier shaft of a rotational measurement system.

When the index disk 5 is mounted on a carrier shaft 9 provided with a retaining flange 10 and, e.g., connected to a drive 11, this in turn causes an elastic radial deformation of the ring 7 in the central opening 6 of the index disk 5, wherein the end position shown at bottom in FIG. 3 is reached. Due to the self-centering effect of the elastic ring 7, a relative position of the index disk 5 with respect to the carrier shaft is achieved when the index disk 5 is mounted on the carrier shaft 9, in which relative position the angle scale 8 is exactly centered with respect to the center axis A'—A' of the carrier shaft 9 with the same accuracy as when the angle scale 8 is arranged on the index disk 5 on the device according to FIG. 2.

FIGS. 4 and 5 show another embodiment example for an index disk 5, wherein FIG. 4 shows a top view and FIG. 5 shows a sectional view along section line V—V.

In this index disk 5, a circumferentially extending ring 12 is fastened in the opening 6, wherein, proceeding from this circumferentially extending ring 12, elastically deformable projections 13 project into the interior of the opening 6 which —similar to the elastically deformable ring 7 in the embodiment example in FIGS. 1 to 3 —are elastically deformed in the radial direction when mounting on the reference shaft 1 or on a carrier shaft 9. In this respect, the shape of these elastically deformable projections 13 are identical and they are also arranged around the entire circumference of the bore hole 6 in a completely uniform and symmetric manner.

Figure 6:
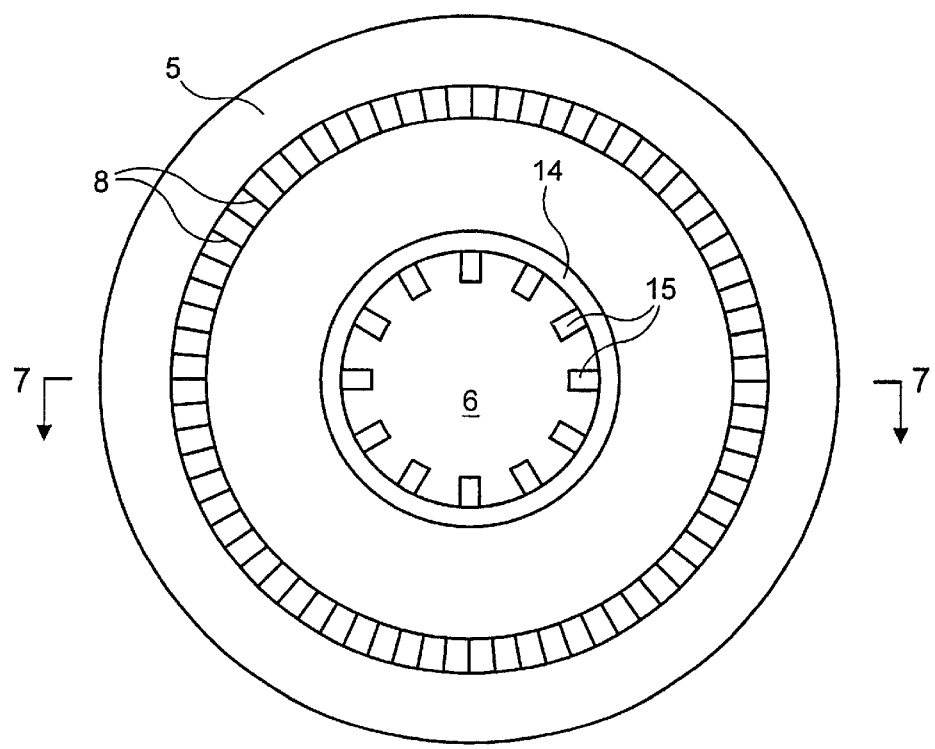
FIG. 6 shows a top view of another embodiment form of an index disk according to the invention.

FIGS. 6 to 8 show another embodiment form for an index disk 5, wherein the angle scale 8 is shown only in the view in FIG. 6 which is a top view of an index disk of the type mentioned above, but is omitted in the views in FIGS. 7 and 8.

In this case, the index disk 5 is provided with a central hub 14 within which the opening 6 is formed. In this embodiment form, as can be seen particularly from the sectional view in FIG. 7 (along section line VII—VII in FIG. 6 in which the index disk 5 is not mounted on a shaft), the clamping device is constructed as springing tongues 15 which are arranged on both sides symmetrically about the circumference of the opening 6. These tongues 15 are provided at their projecting ends with thickened ends 16 which project radially slightly into the opening 6 and are spherically curved on their radially projecting surface and, as is shown in the sectional view in FIG. 8, are pressed against the outer circumference of the shaft 17 accompanied by elastic radial bending so as to have a retaining effect when the index disk 5 is mounted on the carrier shaft 17.

Figure 7:
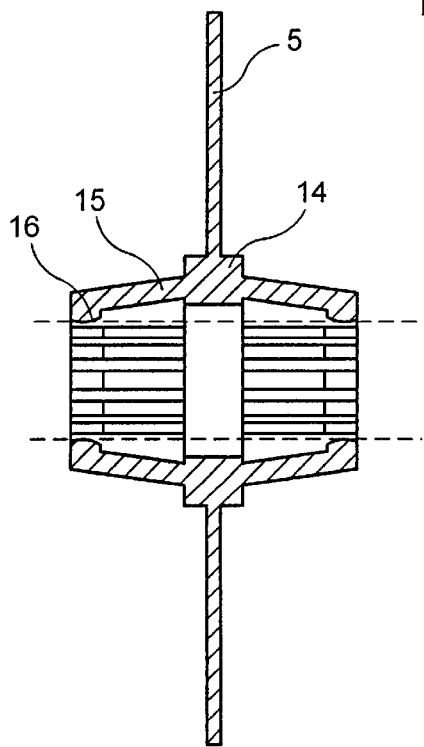
FIG. 7 shows a section through the index disk according to FIG. 6 corresponding to section line VII—VII (in which the index disk is not mounted on a shaft)
Figure 8:
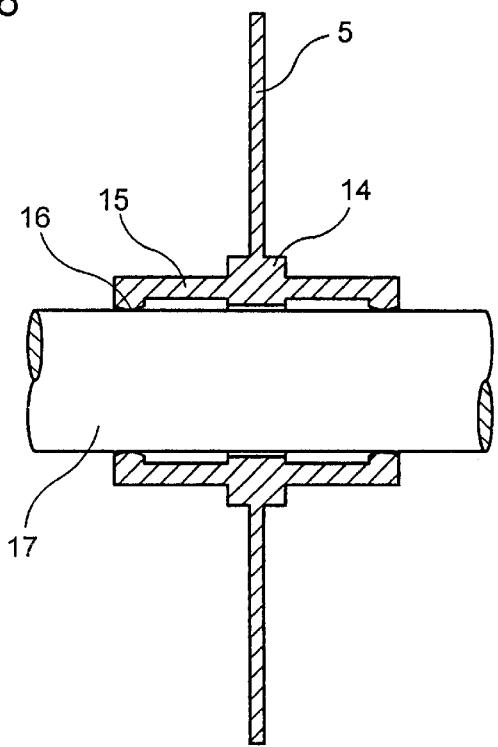
FIG. 8 shows the section from FIG. 7, but after mounting the index disk on a shaft.

As is shown in FIGS. 7 and 8, the springing tongues 15 are formed integral with the hub 14 which is, in turn, formed integral with the index disk 5, so that the index disk 5, the hub 14 and the springing tongues 15, in their entirety, form a part which is injection molded from a suitable plastic in the present embodiment example.

In the relaxed state, i.e., when not mounted on a shaft, the tongues 15 extend in the direction of the interior of the opening 6 with a slight inclination as is shown in FIG. 7. When mounted on the shaft 17 (FIG. 8), the springing tongues 15 in the present embodiment example are bent radially until they are aligned roughly parallel to the outer surface of the shaft 17 and, therefore, vertical to the plane of the surface of the index disk 5 (and to the plane in which the angle scale 8 lies).

The arrangement and shaping of the individual tongues 15 can also be carried out differently as is shown in FIG. 7. For example, it is possible for every projecting tongue 15 to be constructed with a thickness which increases or decreases toward its free thickened end 16, wherein the number of tongues 15 around the circumference of the opening 6 can also be selected in a suitable manner.

It is also possible for the hub 14 and the springing tongues 15 arranged integral at the latter to form an individual part which is itself mounted in the index disk 5 and is fastened at the latter, e.g., by means of a suitable glue.

The tongues are provided on both sides of the hub 14 in the same quantity and arrangement, and therefore symmetrically, so that a particularly exact and fixed alignment of the index disk 5 can be achieved relative to the shaft 17 in the mounted state.

Figure 9:
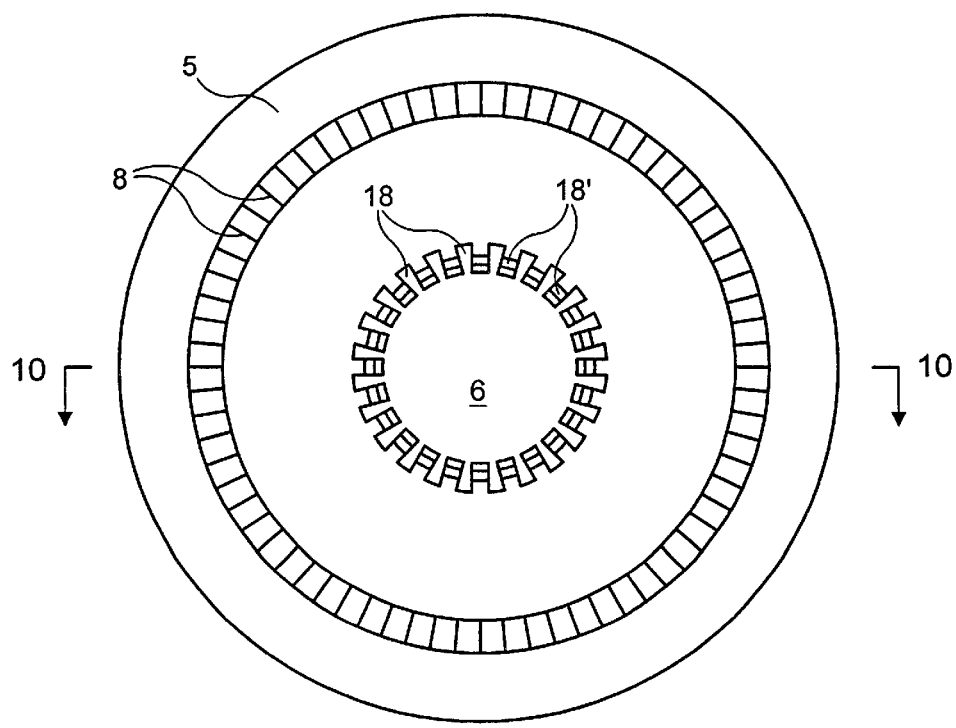
FIG. 9 is a top view of a third embodiment form of an index disk according to the invention.

FIGS. 9, 10 and 11 show another, third embodiment example for an index disk 5 in which the angle scale 8 which is omitted in FIGS. 10 and 11 is again shown only in a top view in FIG. 9.

Figure 10:
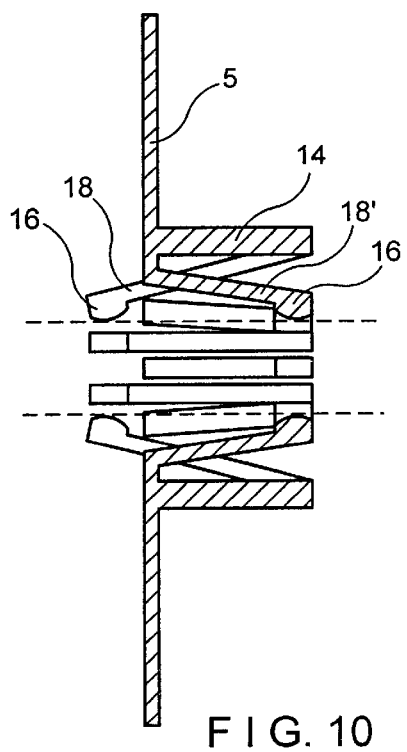
FIG. 10 shows a section through the index disk according to FIG. 9 along section line X—X (in which the index disk is not mounted)

In this case, the index disk 5 is again provided in its central region with a hub 14 which, however, projects only on one side of the index disk 5 as is shown in the sectional view in FIG. 10 (corresponding to section line X—X in FIG. 9).

In this case, springing tongues 18 and 18' are provided, wherein, however, the springing tongues 18 and 18', proceeding from the two axial end sides of the hub 14, alternately extend at an inclination in the direction of the other end side, wherein the view in FIG. 10 is referred to expressly in this regard. As is shown in this view, the springing tongues 18 extend at an inclination through the interior of the opening 6 proceeding from the end of the hub 14 remote of the index disk 5 in the direction of the opposite side and even project beyond the opposite side of the index disk 5 with their thickened end region 16 which is again provided with a spherical shape on its radial inner side.

Figure 11:
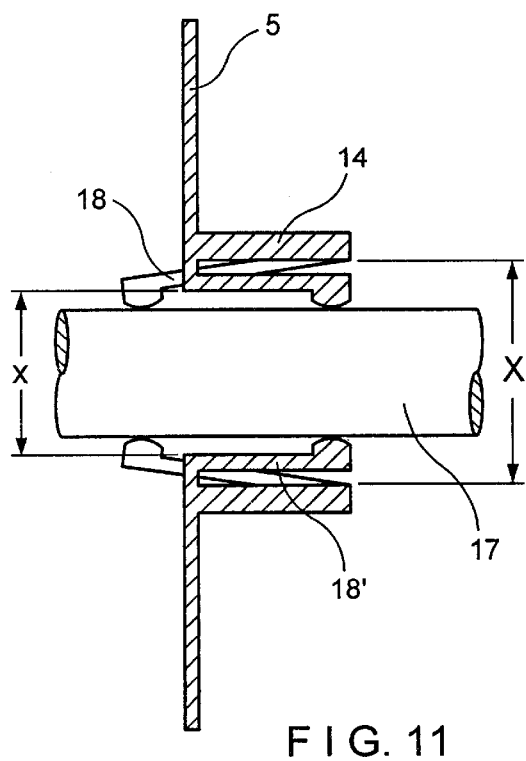
FIG. 11 shows the section through the index disk according to FIG. 10, but wherein the index disk is mounted on a shaft.

The other tongues 18' extend from the other axial end of the hub 14, that is, starting from the opposite plane of the index disk 5, proceeding from an initial radius x which is less than the initial radius X by which the other tongues 18 run out proceeding from the opposite side (compare FIG. 11).

As is shown in FIG. 10, the springing tongues 18 running out at an inclination proceeding from the projecting end of the hub 14 are somewhat longer than the springing tongues 18 which proceed from the opposite end of the hub 14.

FIG. 11 shows the index disk from FIGS. 9 and 10, wherein the index disk 5 is mounted on a carrier shaft 17. As can be seen from FIG. 11, the shorter springing tongues 18' extending from the end of the hub 14 on the index disk side are bent radially until they extend approximately parallel to the outer surface of the carrier shaft 17, while the other tongues 18, also in the mounted state, are inclined relative to the outer surface of the carrier shaft 17. The view in FIG. 11 is referred to expressly in this regard.

The sectional views in FIGS. 10 and 11 show that, in this case also, the index disk 5, the hub 14 and all of the tongues 18 and 18' are made from the same material and are constructed so as to form one piece in their entirety, possibly as an injection molded part. However, it is possible, of course, that the tongues 18 and 18' are manufactured from a different material than the hub 14 and are connected with the hub 14 in a suitable manner or that the tongues 18 and 18' are produced integral with the hub 14 and this part is connected with the carrier disk 5 in a suitable manner.

As is shown in the top view of the index disk 5 in FIG. 9, the arrangement of the tongues 18 and 18' is carried out in such a way that the ends of all the tongues 18 and 18' project radially into the opening 6 by the same distance in the relaxed state, i.e., when the index disk 5 is not mounted. As was already mentioned, the tongues 18 and 18' are arranged alternately, but uniformly in their entirety, around the circumference of the opening 6.

While the foregoing description and drawings represent the invention, it will be obvious to those skilled in the art that various changes may be made therein without departing from the true spirit and scope of the present invention.

What is claimed is:

1. A process for arranging an angle scale at an index disk for rotational measurement systems, wherein the index disk is provided with a central opening for mounting on a carrier shaft in the measuring system, comprising the steps of:

before mounting the index disk on a reference shaft, arranging a clamping device in the central opening, which clamping device deforms elastically in the radial direction when mounting the index disk on said reference shaft and on the carrier shaft, respectively, and subsequently arranging the angle scale on the index disk so as to be exactly centered with respect to the center axis of said reference shaft.

2. The process according to claim 1, wherein a reference shaft is used whose diameter corresponds to the nominal receiving diameter of the carrier shaft for which the index disk is intended.

3. The process according to claim 1, wherein a reference shaft and a contact plate for supporting the index disk are used for arranging the angle scale on said index disk, said contact plate consisting of transparent material and being concentrically arranged to said reference shaft and whose surface being aligned exactly at a right angle to the center axis of said reference shaft, a ruled pattern for an angle scale being arranged on the surface of said transparent contact plate, the index disk being mounted on said reference shaft until contacting the surface of said contacting plate, with subsequently an exposure to the underside of said index disk which is sensitive to said exposure and contacts the surface of said contacting plate being carried out from the opposite side of said transparent contact plate resulting in arranging said angle scale on said index disk.

4. Process according to claim 1, wherein an index disk is used which has a hub within which the central opening is provided.

* * * * *